Patented June 24, 1930

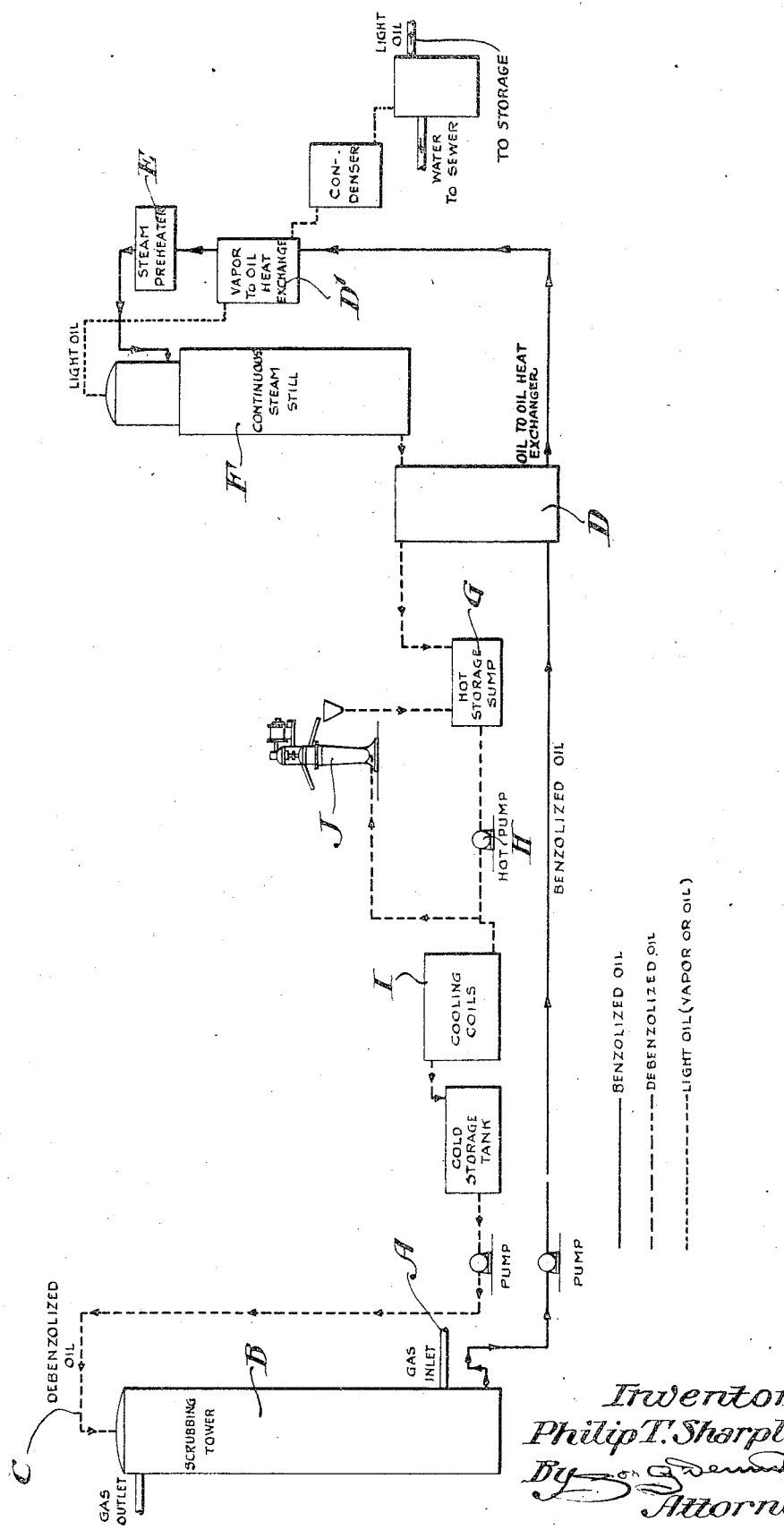

1,766,196

UNITED STATES PATENT OFFICE

PHILIP TRIEST SHARPLES, OF MERION, PENNSYLVANIA, ASSIGNOR TO THE SHARPLES SPECIALTY COMPANY, OF PHILADELPHIA, PENNSYLVANIA, A CORPORATION OF DELAWARE

PROCESS FOR THE RECOVERY OF BENZOL AND THE LIKE

Application filed July 20, 1925. Serial No. 44,907.

My invention relates to processes for the recovery of benzol, tuluol and homologous condensible hydrocarbons or light oils from gases evolved in the destructive distillation of coal, or from water gas, by a cyclic operation involving absorption of desired products in a suitable absorbent menstruum, the liberation of absorbed products from the menstruum by distillation, and the re-use of stripped and cooled menstruum for further saturation. In the practice of such processes, a notable decrease in efficiency occurs when the menstruum has been in use for a time, necessitating the shutting down and cleaning of the apparatus and the "sweetening" of the system by drawing off a portion of the menstruum and replacing it with new absorbent oil. This loss in efficiency results principally from the deposit from the menstruum, on surfaces of the circulating system and particularly on the surfaces of the cooling coils, of a gummy or waxy precipitate, which clogs the passages and forms an insulating coating, and from the formation of emulsions which accumulate in the obsorber, at low points in the system, and at points where the velocity of flow of the menstruum is reduced, thereby decreasing the efficiency of the absorbers and causing stoppage or breakage of pipes and vessels in cold weather.

I have found that the formation of such precipitates and emulsions may be avoided and that they are due primarily to accumulations in the menstruum of nuclei, consisting of finely divided tar, carbon, dust, sand, clay, metal and metal oxides deposited from imperfectly washed gas or resulting from erosion of the apparatus or carried into system from the air, etc.; of suspended moisture left in the gas during the scrubbing thereof; and of sludges resulting from decomposition of the menstruum; and forming foci for the agglomeration of sediment and any or all of which are referred to in the claims as suspended impurities.

The majority of the troublesome nuclei are quite soluble so long as the menstruum is benzolized, but, when the menstruum is debenzolized by distillation and cooled, not only are such nuclei precipitated but they carry down with them otherwise harmless waxy constituents of the menstruum, with resulting formation of large amounts of gummy precipitates. Many of the nuclei or impurities are excellent stabilizing agents for the formation of emulsions, and consequently emulsions are formed wherever water comes in contact with oily menstruum containing such substances. From long continued use of the same menstruum, sufficient detritus may accumulate therein to clog pipes and valves and seriously interfere with the mechanical operation of the plant; rendering frequent cleaning of the system necessary. To shut down an absorber or other unit for cleaning in a plant operating at or near its rated capacity is not only costly in labor and time, but results in the loss of benzol, since the units left in operation must handle more than their normal amount of gas, with correspondingly reduced efficiency.

To prevent or minimize the formation of precipitates and emulsions, in accordance with my invention, I extract the deleterious nuclei from the menstruum by the application thereto of high centrifugal force, which is preferably applied after the benzol-soluble nuclei have been rendered insoluble by debenzolizing the menstruum by distillation and before the bulk of the wax or gum forming constituents of the menstruum have been sufficiently cooled for enmeshment by and precipitation with the nuclei which are entirely insoluble or are insoluble at high temperatures. The application of centrifugal force to the menstruum is preferably effected by means of a centrifuge having a tubular bowl of small diameter relatively to its axial length and an imperforate cylindrical wall; the purified menstruum being discharged continuously from the bowl and the nuclei usually being retained in the bowl which is stopped and cleaned from time to time, depending upon operating conditions and particularly upon the temperature of the menstruum. Should appreciable free water be present in the menstruum, a separator bowl having separate liquid outlets may be used instead of the clarifier type bowl usually used when the menstruum contains little or no free water.

The accompanying drawing shows diagrammatically the layout of a plant adapted for the practice of my invention.

In the preferred practice of my invention, gases containing benzol or similar light oils, after preliminary purification and washing for the removal of ammonia, etc., are brought into intimate contact with a liquid absorbent menstruum, such as straw oil or mineral seal oil; the gases preferably flowing through the pipe A to a tower B, containing means for breaking up the gas stream, countercurrent to oil sprayed from the pipe C into the tower and forming films therein so as to expose the maximum surface of oil to the gas. The amount of benzol absorbed from the gas by the oil is largely dependent upon the temperature of the oil, consequently it is important to introduce the oil to the absorber tower at as low a temperature as operating conditions will permit.

The saturated oil flowing from the absorber has its temperature raised by passage through heat exchangers D, D' and a preheater E and flows to a continuous still F where the crude benzol liquor, or light oil, is distilled off. The debenzolized oil may be drained from the still through heat exchanger D to preheat saturated oil passing to the still, into a sump G, from which it is picked up by a pump H and put through cooling coils I. The stripped oil may be conveniently and satisfactorily withdrawn for centrifuging from this sump and the nuclei extracted therefrom before passing to the chilling coils, as the lower viscosity of the oil at the elevated temperature existing at the sump favors the separation at a high rate of the suspended solid and semi-solid matters and residual moisture which it is desired to remove. Ordinarily there is not sufficient moisture to warrant the use of a centrifugal separator bowl having separate liquid discharge ports, and any moisture extracted is collected in the finely divided detritus in the bowl. While it is desirable to pass the entire body of oil through the centrifuge during each cycle, this is sometimes impracticable and effective results are accomplished by by-passing a portion of the total circulating oil through the centrifuge J in the passage of the oil through the plant. The oil, after its centrifugal purification, may be discharged back to the sump G and pumped with the main flow of oil through the system. While this results in the centrifuge acting upon a mixture of oil that it has just purified and of impure oil discharged from the still, the rate of flow through the system is usually so high in comparison with the rate at which the centrifugal operation is carried out, that the efficiency of the centrifuge is not materially reduced. The purified or partially purified oil pumped from the sump passes through water and/or air cooled cooling coils I and is returned at as low a temperature as possible to the inlet C to the absorber. The elimination by my improvements of the deposit of insulating gummy precipitate in the cooling coils has resulted in the lowering by five degrees Centigrade of the temperature equilibrium of the menstruum under the same cooling conditions.

It will, of course, be understood that the specific design of a plant incorporating my improvements may render desirable the withdrawal of the absorbent oil at a different point and at a lower temperature than above specified; but it is generally best to centrifuge the oil at a temperature approximating that at which it leaves the heat exchanger (95 to 100 degrees C.) because the lower the temperature of the oil, the more solids and semi-solids accumulate in the centrifuge bowl. It is, however, the solids and semi-solids that are insoluble at the higher temperature ranges that are most deleterious. The solids and semi-solids separable by the centrifuge only at temperatures approximating or approaching the temperature at the absorber inlet (30–35 degrees C.) are not substantially injurious to the system and their removal results only in increasing the frequency with which the centrifugal bowl must be cleaned and in lowering the capacity of the centrifuge to remove the more harmful impurities.

My copending application Serial No. 20,758 filed April 4, 1925, is directed to the solution of a problem having features in common with this invention and the claims thereof are limited to the dividing of the stream of absorption menstruum and the centrifugal treatment of one branch of that stream, and the claims hereof are not.

By my improvements, I avoid the deposit of detritus in the system; obviate or minimize the formation of emulsions and precipitates, with consequent increase in the efficiency of the absorber and coolers and avoidance of necessity for cleaning; avoid wastage of the absorber oil; reduce the temperature equilibrium of the absorber oil under the same cooling conditions; and substantially increase the yield of benzol.

Having described my invention, I claim:

1. The improvement in the process of extracting benzol or the like from gases by absorption in a menstruum and separation of the benzol and menstruum by distillation and cooling the menstruum, which comprises extracting suspended impurities from the separated menstruum by centrifuging the separated menstruum before the substantial chilling thereof.

2. The improvement in the process of extracting benzol or the like from gases by a cyclic operation involving absorption of desired products in a suitable absorbent menstruum, the liberation of absorbed products from the menstruum by distillation, and the use of stripped and cooled menstruum for further saturation, which comprises extracting by centrifugal force nuclei tending to form precipitates and emulsions from the menstruum between the stripping and the cooling thereof to the temperature for further saturation.

3. The process which comprises absorbing a constituent of a gas in and stripping it from a liquid menstruum in a cyclic operation, and centrifuging the menstruum flowing in the cycle and thereby removing therefrom suspended particles of finely divided matter.

4. The improvement in the process of extracting condensable hydrocarbons from gases by a cyclic operation involving absorption of desired hydrocarbons in a suitable absorbent menstruum, the removal from the menstruum by distillation of desired hydrocarbons absorbed therein, and the re-use of stripped menstruum for further absorption, which comprises separately extracting from the menstruum nuclei tending to form precipitates or emulsions therein by centrifuging the menstruum after it is substantially freed of desired hydrocarbons and before it is re-used for absorption.

5. The improvement in the process of extracting condensable hydrocarbons from gases by a cylic operation involving absorption of desired hydrocarbons in a suitable absorbent menstruum, the removal from the menstruum by distillation of desired hydrocarbons absorbed therein, and the re-use of stripped menstruum for further absorption, which comprises separately extracting from the menstruum contaminating material of higher specific gravity than the menstruum by centrifuging the menstruum after it is substantially freed of desired hydrocarbons and before it is re-used for absorption.

In witness whereof I have hereunto set my name this 15 day of July, 1925.

PHILIP TRIEST SHARPLES.